May 20, 1969 W. R. HEFFERNAN 3,445,558
METHOD OF MAKING A CONTAINER
Filed March 14, 1966 Sheet 1 of 2
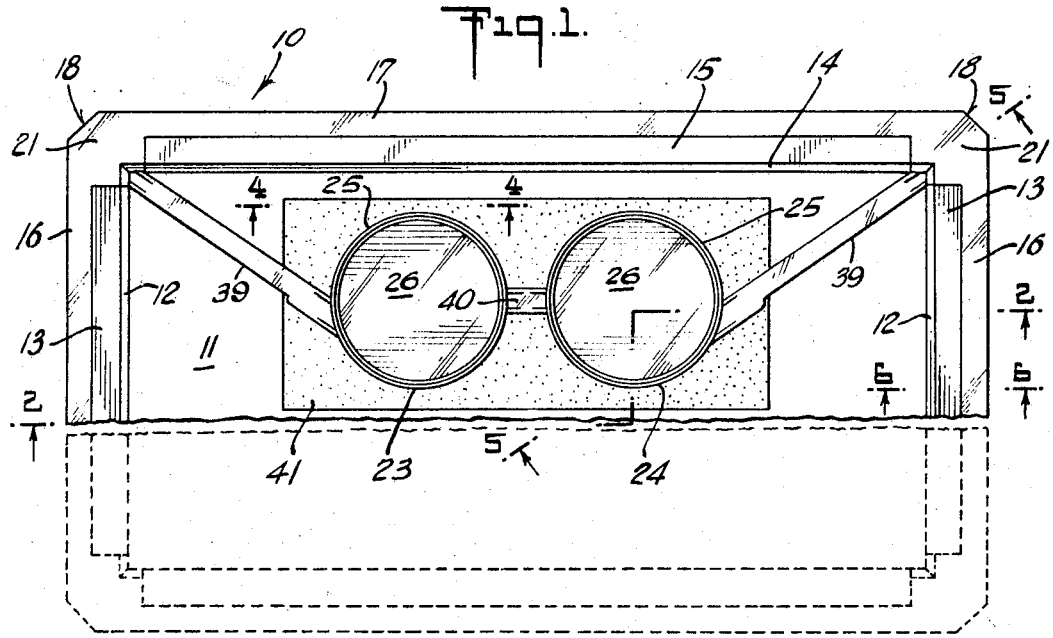
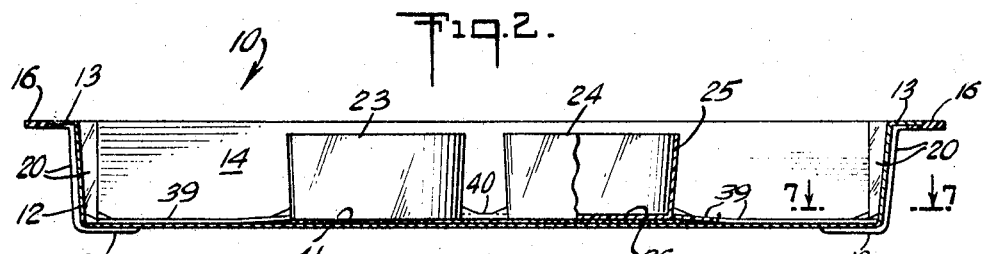
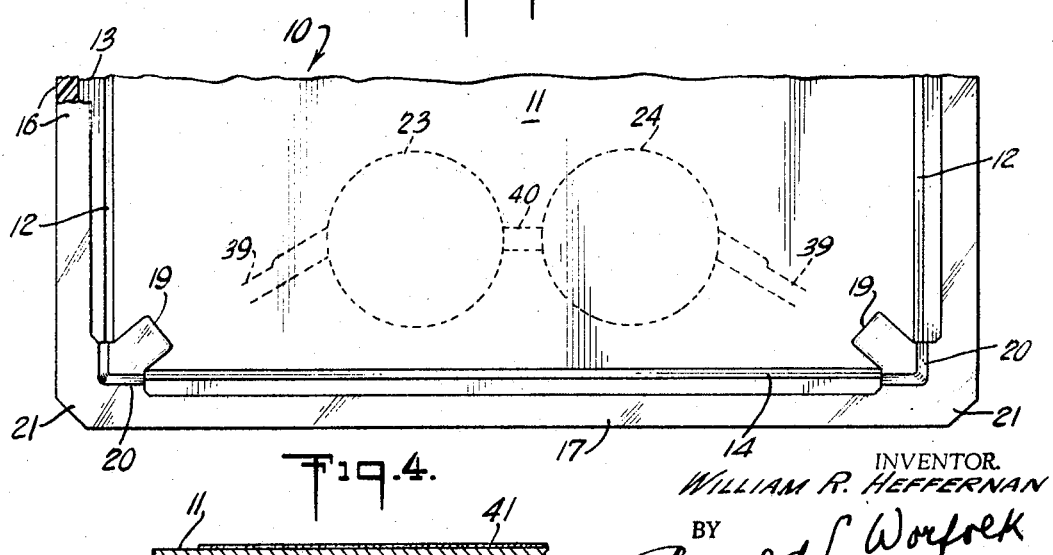
INVENTOR.
WILLIAM R. HEFFERNAN
BY Arnold S. Worfolk
ATTORNEY May 20, 1969  W. R. HEFFERNAN  3,445,558
METHOD OF MAKING A CONTAINER
Filed March 14, 1966  Sheet 2 of 2
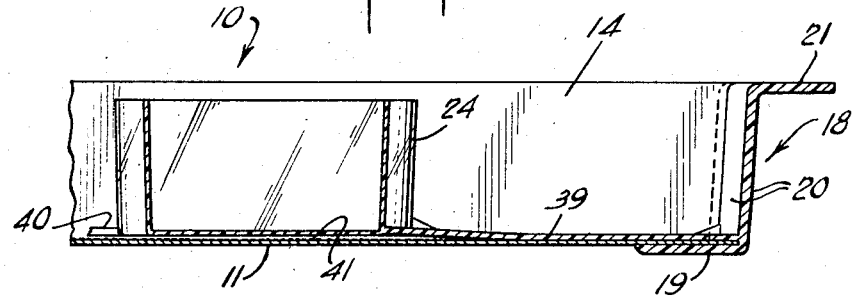
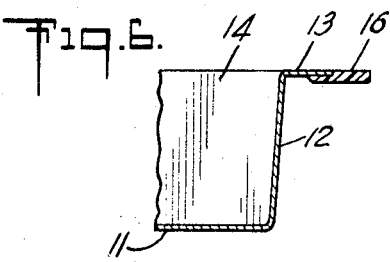
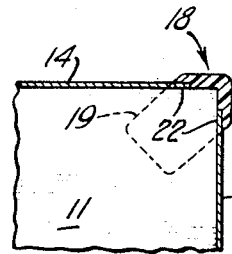
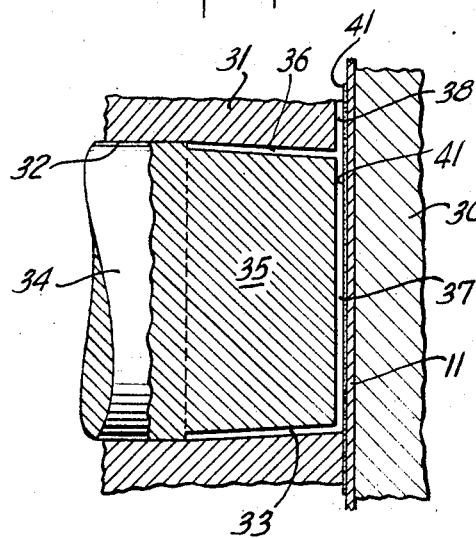
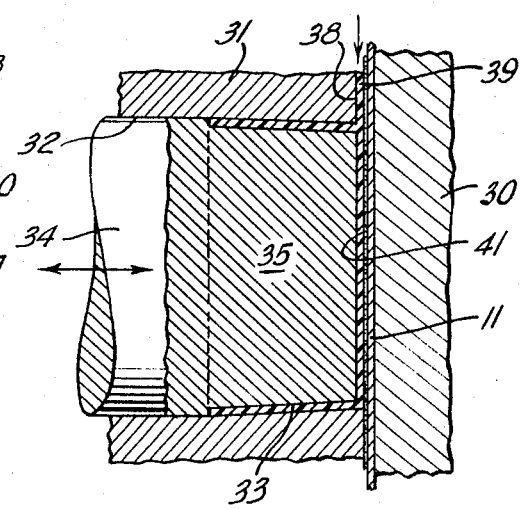
INVENTOR.
WILLIAM R. HEFFERNAN
BY
Arnold S. Woyfolk
ATTORNEY

United States Patent Office 3,445,558
Patented May 20, 1969

3,445,558
METHOD OF MAKING A CONTAINER
William R. Heffernan, Westfield, N.J., assignor to Johnson & Johnson, a corporation of New Jersey
Filed Mar. 14, 1966, Ser. No. 533,945
Int. Cl. B32b 7/06
U.S. Cl. 264—242
2 Claims

ABSTRACT OF THE DISCLOSURE

A composite container having flexible paneling with a molded plastic frame of structural member sections determining the contour of the flexible paneling and having plastic partitioning means for segregating the contents of one section of the container from contents in a different section, is molded by at least partially closing the mold matrices during the molding operation with the paneling material itself where adhesion between the plastic frame member is desired and by closing the partition matrix by a spacer adhesively incompatible with the plastic in areas where no connection between the partitioning means and the paneling is desired.

---

This invention relates to a composite container of the type disclosed in Schenk et al. Patent 3,119,540 wherein sheet material is located in a mold with panel portions thereof disposed in the relative positions they will occupy in the finished container and wherein plastic material is injected into the mold to form plastic frame elements interconnecting and reinforcing the panels.

More particularly the invention relates to a method of making such a container wherein one or more plastic means other than the frame elements having a spatial relationship with respect to the enclosure defined by the container is formed by injection molding concurrently with the reinforcing frame elements free of engagement with the panel structure of the container.

In carrying out the invention, sheet material, blanked to present desired panel sections is disposed with respect to male and female mold sections such that when the mold is closed, the panel sections are disposed in relative positions they ultimately occupy in the container, and in relative positions also with respect to mold cavities including mold cavities presenting matrices for the frame elements and the plastic elements other than the frame elements such that when a plastic material is injected into the mold cavities, not only is there formed the container per se but also said second plastic means in the desired spatial relationship vis a vis the container enclosure.

In accordance with the invention, panel sections define in part the matrices in which the receptacles are molded, and the second plastic means are molded loose from such panel sections by denying access of molten thermoplastic to the pores of the panel material thereby preventing adhesion of the thermoplastic to such material. Such a procedure not only provides a structure where the second plastic means (a receptacle, for instance) is free of the panel where that is desired per se but it also eliminates distortion of the plastic material or of the paneling material, one by the other, where such materials have different coefficients of expansion. Where the second plastic means and the panel elements are free of each other, contraction of one is quite independent of contraction in the other.

A better understanding of the invention may be had from the following description read in conjunction with the accompanying drawings wherein:

FIG. 1 is a top plan view partly in phantom, of a composite flexible sheet material and injection molded plastic container equipped with the present improvements;

FIG. 2 is a vertical sectional view on line 2—2 of FIG. 1.

FIG. 3 is a partial bottom plan view of the container shown in FIG. 1.

FIGS. 4, 5 and 6 are partial vertical sectional views on lines 4—4, 5—5 and 6—6 respectively of FIG. 1.

FIG. 7 is a partial horizontal sectional view on line 7—7 of FIG. 2.

FIG. 8 is a fragmentary sectional view through a mold cavity for forming plastic means such as a receptacle associated with a container equipped with the present improvements and wherein the mold cavity is presented by the male mold member, a member movable in and with respect to the male mold section, and by a panel of flexible sheet material buttressed by the female mold member; and FIG. 9 is a fragmentary sectional view through the mold cavity of FIG. 8 after the cavity has been filled with thermoplastic material.

The invention is illustrated in connection with a shallow tray type composite container 10 comprising a blank of flexible sheet material such as paper, paper board, cardboard, foil, and laminates thereof cut or stamped to present a bottom panel 11, end panels 12 with marginal flange sections 13, and side panels 14 with marginal flange sections 15 (FIGS. 1, 2 and 3).

Such a blank is folded by presentation to the face of a female mold section (fragmentally shown in FIGS. 8 and 9) and subjected to the action of a complementary male mold section which, as it enters the female mold section bends the end and side sections 12 and 14 almost at right angles to the bottom panel 11 except for a taper which facilitates mold separation, and then the flange sections 13 and 15 outwardly in a direction generally parallel with the bottom panel.

Mold cavities in the female mold section which extend all around the container rim and which are closed in part by the male mold section and in part by marginal edge portions of the blank extending into such cavities form a matrix for reinforcing plastic end rails 16 and side rails 17 which are injection molded therein.

The container is formed at each corner with a rigid plastic reinforcing frame member 18 which includes a footing 19 bonded to the bottom surface of the base panel 11, an integral upright section 20 angular in cross section and a horizontally disposed flange member 21 at the top which merges into the end and side flange members 16 and 17. As in the case of the flange members 16 and 17, each corner reinforcing plastic frame member 18 is injection molded in a matrix presented by a mold cavity in the female mold section and which is closed in part by the male mold section and in part by marginal end portions 22 of the blank sections 12 and 14 extending into the mold cavity.

An inlet gate for introducing liquid thermoplastic into the mold may be located at each corner of the mold if desired preferably, in the present instance, in a position underlying each of the corner footings 19.

A plastic form is located in a fixed position with respect to the containers' enclosure. The form in the illustrated embodiment disclosed, is a plurality of receptacles 23 and 24 having a wall 25 with cylindrical configuration and bottom 26. A suitable mold for producing this receptacle form is shown in FIGS. 8 and 9. It includes a portion 30 of the female section and a portion 31 of the male section between which the base panel 11 of the container is clamped during the injection molding operation. A cylindrical recess 32 which opens in the face of the male mold section opposed to the female section, and which has a somewhat tapered portion 33 adjacent its outer end, accommodates a slideable piston like member 34 having a shape complementary to the cylindrical recess 32 except near its outer tapered end portion 35 which is reduced in diameter to provide an annular space or cavity 36 defined by the walls of the cylinder and piston when the latter is in its outermost position. The walls of the receptacles 23 and 24 are molded in annular spaces of mold sections thus defined, there being one such mold section for each of the receptacles 23, 24.

With the mold fully closed, the piston 34 in its outermost position stops short of the container base 11 to define a thin circular space 37 communicating at its periphery with the annular space 36 to complete the cavity in which a receptacle is cast. A runner 38 (only part is shown) presented in the face of the male mold section 31 and which extends from each receptacle cavity 36 to the nearest cavity in which a corner member 20 is cast, insures delivery of molten plastic material to the receptacle molds during the injection molding operation. In these runners 38 there are formed plastic ties 39 of sufficient strength to insure maintenance of the receptacles in their proper positions for the purpose intended.

Still another anchor is provided in the form of a connecting tie strip 40 between the receptacles and which is molded in a runner, not shown, interconnecting the receptacle cavities.

In accordance with the invention, the receptacles are molded free of the adjacent container panel while still maintaining their ties with the structural frame elements of the container or with the container panel at a position spaced from the receptacle per se. One reason may be a desire to have a cushioning connection between the receptacles and the container walls. Another may be a desire to divorce the shrinkage phenomenon of one material from that of the other in instances where such phenomena differ.

One way of accomplishing this desideration is to apply a coating 41 to the container panel in the region where the receptacles are molded (FIGS. 1, 4, 8 and 9). Such a coating may be a varnish, or a silicon that will adhere to the panel material per se but which adhesively is incompatible with the plastic material of which the receptacles are molded. Or the container panel may be a foil laminate with the foil presented by the face of the panel which closes the mold, or merely a loose foil or foil laminate insert in lieu of a coating held in position opposite the mold cavity or cavities which forms the receptacle or receptacles during the injection molding operation. Regardless of the type of separator means 41 employed, the receptacles 23, 24 as the case may be, will be detached from the adjacent paneling in the vicinity of the separator but nevertheless attached to the container by the ties 39 which either may be anchored adhesively to the paneling at a position spaced from the receptacle or interconnected directly with a plastic member 20 which, of course, in turn is anchored to the paneling.

The invention has been described in connection with a preferred embodiment but many other embodiments are included within its spirit.

What is claimed is:

1. In the method of making a container with flexible paneling of paper, paperboard. cardboard, foil, laminates thereof, or the like, with a frame of rigid plastic structural member sections having a given spatial relationship defining the areas presenting the paneling and being bonded to the paneling along marginal edges thereof to maintain a given contour in the paneling, and with plastic partitioning means having regions of connection with the paneling for determining the location of the partitioning means in the container and other regions of disconnection with said paneling, the steps which include locating the flexible paneling in a mold having matrix cavities for the plastic structural member sections and for the plastic partitioning means, moving the mold to mold-closing position at least partially to close the matrix cavities with the paneling for a plastic injection cycle, and injecting into said cavities plastic material having adhesive compatibility with the paneling, said matrix cavities in the regions of disconnection between the paneling and the partitioning means being closed during the injection-molding cycle by a spacer adhesively incompatible with the plastic material and which is carried by the paneling.

2. The method according to claim 1 wherein the adhesively incompatible spaced is a film coated on the paneling means.

References Cited

UNITED STATES PATENTS

| 3,336,427 | 8/1967 | Hanson | 264—264 |
| 2,538,658 | 1/1951 | Saurer | 264—264 X |
| 3,314,644 | 4/1967 | Dwyer et al. | 264—242 X |

ROBERT F. WHITE, Primary Examiner.

T. J. CARVIS, Assistant Examiner.

U.S. Cl. X.R.

220—20; 264—264